United States Patent [19]

McNaney

[11] 4,179,689

[45] Dec. 18, 1979

[54] GRAPHIC SYMBOL DISPLAY SYSTEM

[76] Inventor: Joseph T. McNaney, 8548 Boulder Dr., La Mesa, Calif. 92041

[21] Appl. No.: 955,111

[22] Filed: Oct. 26, 1978

[51] Int. Cl.[2] .......................... G01J 1/34; G08B 5/36
[52] U.S. Cl. .......................... 340/378.3; 340/811
[58] Field of Search .......................... 340/378.3, 783, 700, 340/757, 811

[56] References Cited

U.S. PATENT DOCUMENTS 3,541,542 11/1970 Duguay .............................. 340/811

*Primary Examiner*—Harold I. Pitts

[57] ABSTRACT

The invention relates to graphic symbol display means, and more particularly to a high speed system for presenting images of individual letters, numerals, etc., along a common optical axis of the system which have been selected from an illuminated matrix array of such symbols. The system is directed toward use in electronic computer output controlled printers or photocomposing machines.

5 Claims, 6 Drawing Figures

GRAPHIC SYMBOL DISPLAY SYSTEM

SUMMARY OF THE INVENTION

A light mask having light beam forming windows is a central element of the display system. Each window in the mask is representative of a graphic symbol, such as a letter, numeral, etc., and arranged therein substantially along Cartesian coordinates. A laser source of radiant energy is positioned at a mask illumination control first end of the system. An information display medium, such as a light sensitive or light responsive means, for receiving individually illuminated images of windows in the mask, is positioned at a second end of the system. First acousto-optic light deflector means at the first end of the system are utilized in the allowing of windows in the mask to receive light, selectively, from the laser source. Second acousto-optic light deflector means at the second end of the system, in combination with additional optical means, are utilized in the allowing of the display medium to be exposed to images of windows in the mask simultaneously with the selective illumination thereof. The invention, additionally, utilizes a predetermined array of light reflector means for allowing light from said source to follow a series of 360° optical paths extending to said mask and from windows in the mask to said display medium.

An object of the invention is to establish real images at the surface of the display medium of the character shaped windows in the mask as the windows are illuminated, selectively, from said laser source of radiant energy.

In accordance with the invention herein a further object is to provide a most efficient and compact means for providing real images of any of a plurality of individually generated graphic symbols along a common optical axis at the output of the system.

A preferred embodiment of the invention herein shows, by way of example only, the means by which such objectives can be met. The description which follows, when read in connection with the drawing, will provide a better understanding of these objectives of the invention as well as other advantages included therein.

DESCRIPTION OF THE INVENTION

Figure 1:
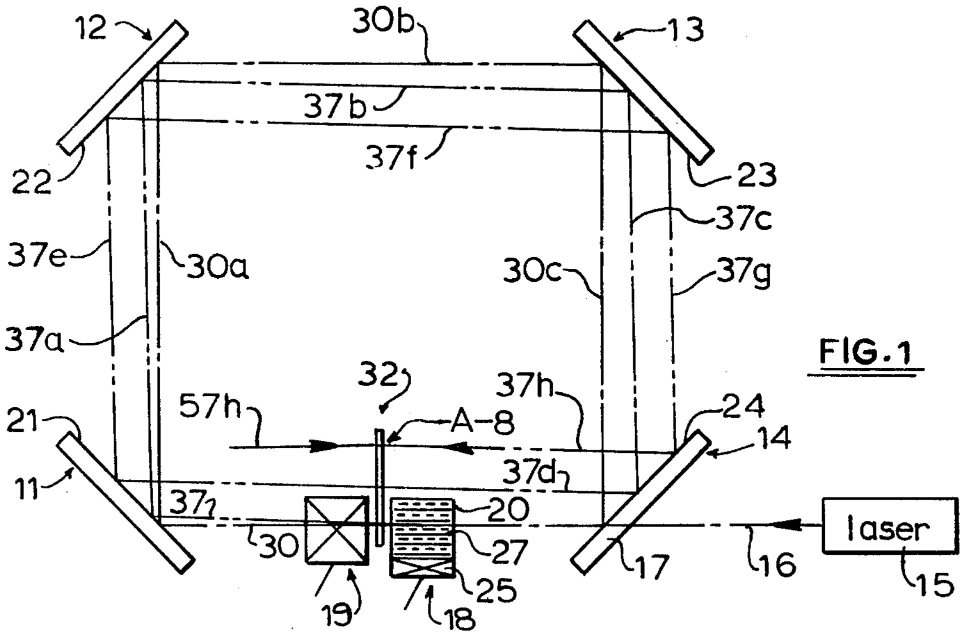
FIG. 1 is a first end view of the system showing a positional relationship between the various elements comprising a primary section of the invention.

Referring now to FIG. 1, the invention is shown to include the use of an array of four light reflectors 11, 12, 13 and 14, but can involve the use of more or less than these four reflectors and still meet the objectives of this invention. Each of the reflectors will be described as having, respectively, reflecting surfaces 21, 22, 23 and 24. A beam of light, preferably from a laser source of radiant energy, which can extend from ultraviolet through the visible spectrum to infrared, is directed from the source 15 along an input path 16 of the system. Along this path a beam will avoid the first end 17 of the reflector 14, but will pass through a light conducting medium of a first acousto-optic light deflector 18, through a light conducting medium of a second acousto-optic light deflector 19, and toward the light reflecting surface 21.

Each deflector 18 and 19 includes a light conducting interaction medium 20 and an electro-mechanical transducer 25 intimately associated therewith. Each transducer will receive an excitation alternating voltage from a variable frequency generator 26, noted in FIG. 4. Upon applying such voltage to a transducer 25, the latter establishes in the medium 20 an ultrasonic energy beam 27 which effects a perturbing of the refractive index of the medium 20 and acting as a phase grating, the spacing of which is proportional to the frequency of the voltage and the grating density is proportional to the potential of the voltage and the resulting acoustic power. For efficient deflection in either of the deflectors 18 and 19 of a beam of light along the input path 16, the beam along this path and the acoustic beam 27 must interact at the Bragg angle. This angle is defined by the ratio of the sound to light wavelengths and it should be understood that the deflectors 18 and 19 will be positioned accordingly in relation to the incident beam along the input path 16.

To exemplify at least one set of conditions under which the invention can be allowed to function the wavelength of light from laser source 15 can be understood as being 6328 Angstroms and the frequency of the alternating voltage from the generator 26 will be understood as being 50 MHz. Under these conditions it will also be understood that a beam of light along the input path 16, relative to a 0-order nondiffracted beam through the medium 20 of the first and second deflectors 18 and 19, and in response to the 50 MHz frequency voltage from the source 26 to each of these deflectors, will be deflected along a path that will be referred to as a 1st-order optical path 30 toward surface 21 of the reflector 11.

Figure 3:
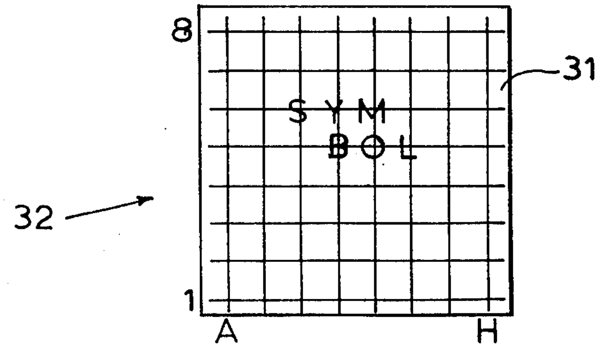
FIG. 3 represents a possible X and Y arrangement of windows in a light mask, each representative of graphic symbols, which includes an arranging of such symbols substantially along Cartesian coordinates.
Figure 4:
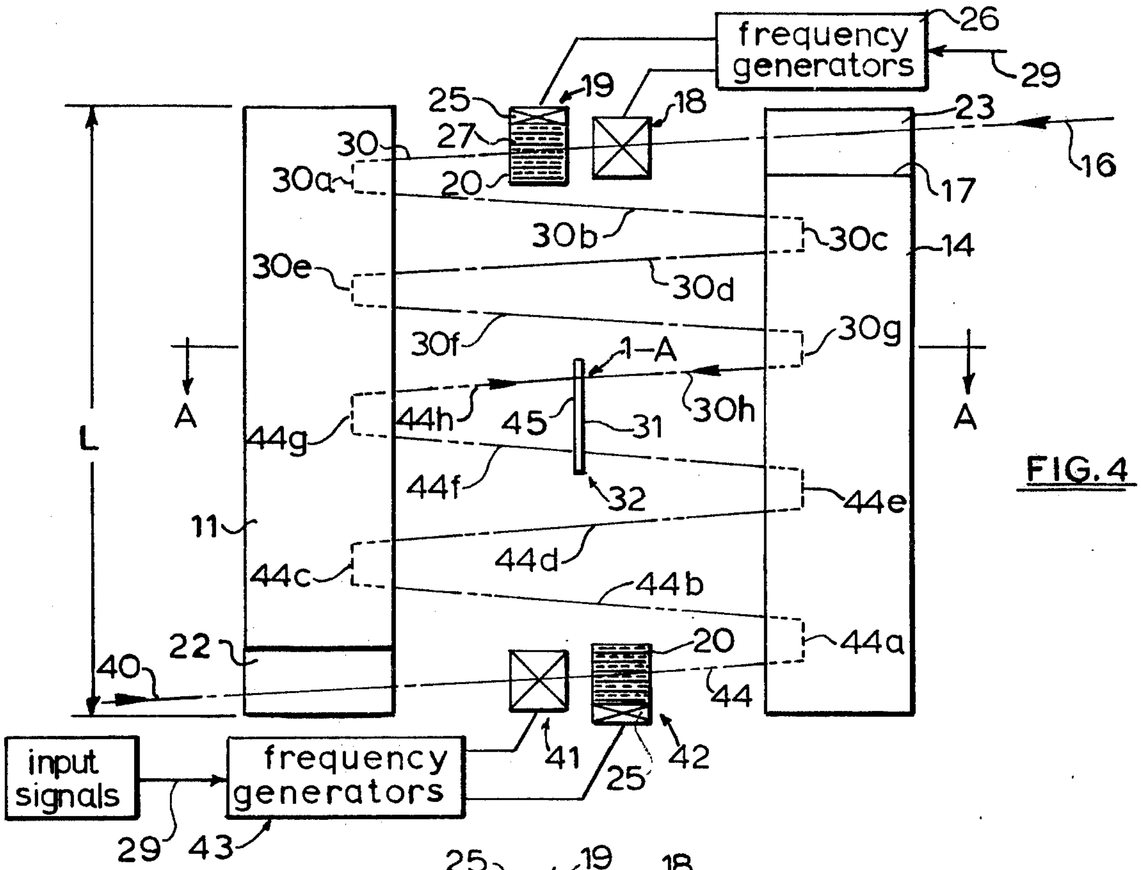
FIGS. 4 and 5 each represent a side view of the system again showing a positional relationship between the various elements along a length dimension including, respectively, first and second optical paths for light through the system.

Referring now to FIGS. 1 and 4, the beam along this 1st-order path will be reflected at surface 21 and along an extension of the path 30 along a segment 30*a* toward surface 22, reflected therefrom along a segment 30*b* toward surface 23, reflected therefrom along a segment 30*c* toward surface 24, reflected therefrom along a segment 30*d* toward surface 21 again, as noted in FIG. 4, since in FIG. 1 segment 30*d* is directly below segment 30. From surface 31 this 1st-order path of the beam continues along a segment 30*e* toward surface 22, reflected therefrom along a segment 30*f* toward surface 23, reflected therefrom along a segment 30*g* toward surface 24 and, finally, reflected therefrom along a segment 30*h* toward a reference position coordinate A-1 at the surface 31 of the mask 32. This A-1 position is identified in FIG. 3 and is representative of a position containing a graphic symbol window. But symbols are not shown.

In response to the connecting of further control signals to the input circuits 29 of one, or both, of the generators 26, and to subsequent changes in the frequency of the output voltage, corresponding changes in the deflection angle of the beam can be effected relative to the 1st-order path of the beam. If, for example, an increase in the output frequency of the voltage, from 50 MHz to 90 MHz, is extended to the transducer 25 of the deflector 18, and that such increase provides an angular change in the light path of 7 milli-radians, relative to the 1st-order path 30, such change would correspond to a redirecting of the beam from the A-1 coordinate position at the mask 32 to the A-8 coordinate position. The redirecting of the beam will then amount to 1 milli-radian per window position in the Y-direction at the mask 32. Similarly, when such increases in the voltage frequency are extended to the transducer 25 of the deflector 19, the redirecting of the beam will be equal to 1 milli-radian per window in the X-direction at the mask from the 1-A coordinate position to the 1-H coordinate position. Under these circumstances, any one of sixty-four windows can be illuminated at any one of the sixty-four different Cartesian coordinates at the mask 32.

Figure 5:
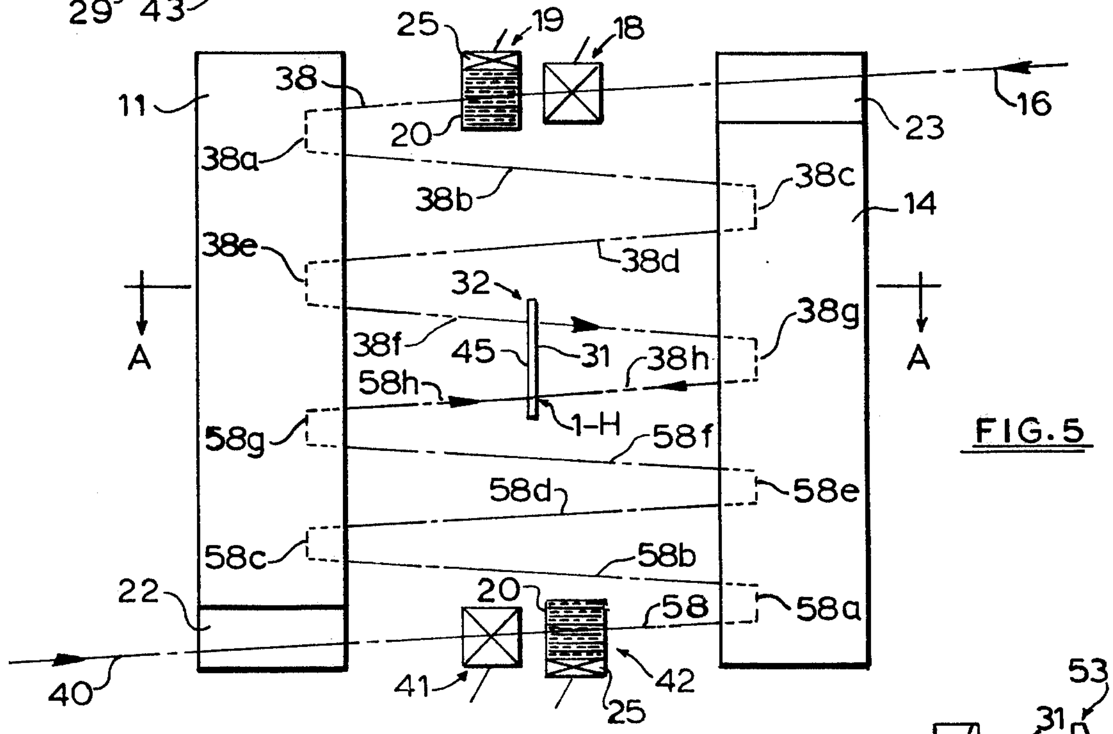

In FIG. 1, the light path stemming from the first deflector 18 and toward the A-8 coordinate position includes segments 37, 37*a*, 37*b*, 37*c*, 37*d*, 37*e*, 37*f*, 37*g*, 37*h*. Referring now to FIG. 5, the light path stemming from the second deflector 19 and toward the 1-H coordinate position includes the segments 38, 38*a*, 38*b*, 38*c*, 38*d*, 38*e*, 38*f*, 38*g*, 38*h*.

Although the symbol forming mask 32 described herein is one containing but sixty-four windows, it is not to be limited in this regard. A 10×10 array of coordinate positions for such windows can be utilized, as well as still other arrangements. It is well to note that the center-to-center spacing of the Cartesian coordinates in either the X or Y directions can be exemplified as being one milli-meter; the light beam deflection requirement from one such position to the next is one milli-radian; and the optical path length between the pair of deflectors, 18 and 19, and the mask 32 is approximately one meter. The light beam folding effect of the array of reflecting surfaces 21, 22, 23 and 24, however, minimizes this length dimension.

Figure 2:
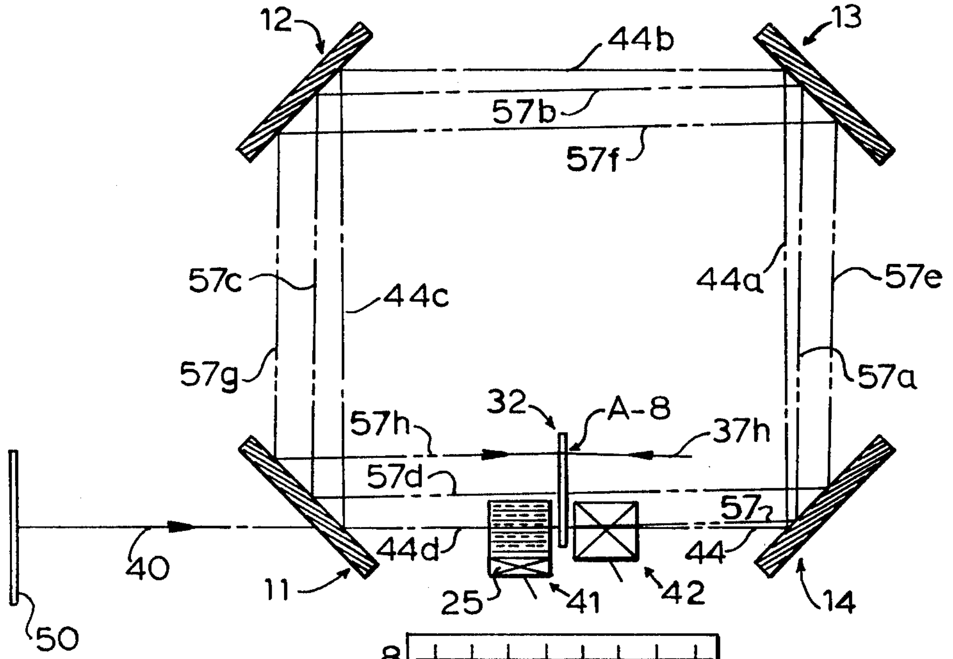
FIG. 2 is a sectional view showing a positional relationship between the various elements comprising a secondary section of the invention.
Figure 6:
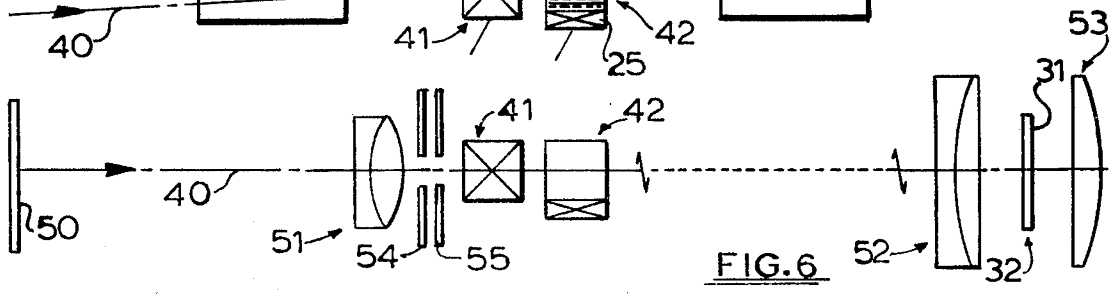
FIG. 6 exemplifies the use of a system of optical elements along an optical path in the invention, not shown in other Figures.

The foregoing discussion of the invention has been devoted entirely to the primary section of the display system. A secondary section, in several ways identical to that of the first section is shown in FIG. 2, and a side view thereof is shown in FIGS. 4 and 5. The four reflectors 11, 12, 13 and 14 extend into the second section, having an overall length dimension L, and at the opposite end a second pair of acousto-optic light beam deflectors 41 and 42 are included, each like that shown at the first end of the system. The deflector 41 will be allowed to function the same as, and synchronously with, deflector 18. The deflector 42 will be allowed to function the same as, and synchronously with, deflector 19. However, these deflectors will be utilized as viewing means of illuminated windows in the mask 32, in combination with additional optical means positioned along a light output path 40 as shown in FIG. 6.

Relative to a 0-order nondiffracted beam path through the medium 20 of the first and second deflectors 41 and 42, and in response to a 50 MHz frequency voltage from a source 43 to each of these deflectors, a 1st-order optical path 44 will have been established extending from the output path 40 to the 1-A coordinate position at the surface 45 of the mask 32. Within the array of reflector surfaces 21, 22, 23 and 24, as noted in FIGS. 2 and 4, the optical path 44 will include the segments 44*a*, 44*b*, 44*c*, 44*d*, 44*e*, 44*f*, 44*g* and 44*h*. As in the case of the deflectors 18 and 19, the deflectors 41 and 42 will be oriented in relation to the optical path 40 at the Bragg angle and most efficient manner for establishing a 1st-order optical path.

An information display medium 50 is positioned along the output path 40 at a second end of the display system. A first lens system 51 intermediate the medium 50 and the deflectors 41–42, and a second lens system 52 intermediate the deflectors 41–42 and the mask 32 will be designed to effect the projection, imaging and focusing of a selectively illuminated graphic symbol window in the mask at the display medium 50. An additional lens 53 will allow the beam of light from the source 15 to be substantially normal to the surface 31 upon reaching a window in the mask 32. The diameter of the beam will be at least large enough between $1/e^2$ intensity points to cover a symbol shaped window in the mask. A mask 54 is positioned along the output path 40 to block any extraneous light, allowing only a passing of parallel rays which forms a symbol shaped window.

An information display medium 50 is positioned along the output path 40 at a second end of the display system. A first lens system 51 intermediate the medium 50 and the reflectors 41–42, in combination with a second lens system 52 intermediate the reflectors 41–42 and the mask 32 will be designed to effect a projecting, imaging and focusing of a selectively illuminated symbol at the medium 50. An additional lens system 53 will allow the beam of light from the source 15 to be substantially normal to the surface 31 upon reaching a window means in the mask 32. The diameter of this beam should be at least large enough between $1/e^2$ intensity points to cover a particular window means. Second and third masks 54 and 55 are positioned along the path 40 to block passage of any extraneous rays of light and sidebands relative to a 1st-order or diffracted light emerging from the reflectors 41–42, and permit passage of only the collimated rays of the 1st-order which are representative of an image shaped window means. The central portion of each mask will function like that of a miniature venetial blind consisting of closely spaced louvers, limiting passage of only those rays of the light parallel to the output path 40; mask 54 being angularly oriented relative to the orientation of reflector 41 and mask 55 being oriented relative to the orientation of reflector 42.

In FIG. 2, the optical path along which the display medium 50 will be exposed to an image of the illuminated window means at the A-8 position in the mask includes the path segments 57, 57*a*, 57*b*, 57*c*, 57*d*, 57*e*, 57*f*, 57*g* and 57*h*. The perturbing of the index of the medium 20 of the reflector 41, in response to an applying of, for example, a 90 MHz signal to the transducer 25 results in a reflecting of the rays of light therein representative of the symbol at the A-8 position and now allowed to follow the output path 40.

In FIG. 5, the optical path along which the display medium 50 will be exposed to an image of the illuminated window means at the 1-H position in the mask includes the path segments 58, 58*a*, 58*b*, 58*c*, 58*d*, 58*e*, 58*f*, 58*g*, 58*h*. The perturbing of the index of the medium 20 of the reflector 42, in esponse to an applying of, for example a 90 MHz signal to the transducer 25 results in a reflecting of the rays of light therein representative of the symbol at the 1-H position in the mask and now allowed to follow output path 40.

Additional light reflector means, such as a mechanically motivated mirror for example, but not shown in the drawings, can be utilized between the lens system 51 and the display medium 50 providing horizontal positioning of light images at the medium 50 in relation to vertical displacements thereof.

As set forth herein, in regard to the operation of the reflector 41, a perturbing of the medium 20 is effected in a sequential manner, involving seven discrete steps beginning with the selecting of row A-1 in the matrix 32. Each said step corresponds to a predetermined high frequency voltage to the transducer 25 within the range extending from an initially applied signal of 50 MHz to 90 MHz so as to provide the selecting of any of the other seven rows of symbols extending from the row A-1 to A-8. And in regard to the operation of the reflector 42, a perturbing of the medium 20 is effected in a sequential manner, involving seven discrete steps beginning with the selecting of column 1-A in the matrix 32. Each said step corresponds to a predetermined high frequency voltage to the transducer 25 within the range extending from an initially applied signal of 50 MHz to 90 MHz so as to provide the selecting of any of the other seven columns of symbols extending from the column 1-A to 1-H in the matrix.

An alternative to the foregoing described sequential means of establishing the light reflecting paths between the matrix 32 and the display medium 50 includes the applying of each frequency voltage within a required range of such voltages to the transducer 25 of the reflector 41 and to the transducer 25 of the reflector 42 simultaneously, instead of serially. In doing so eight individual optical paths will fan out from the path 40 and about a mid position of the medium 20 of reflector 41, relating the path 40 to each of the eight coordinate positions A-1 through A-8 of the matrix 32. Also, eight individual optical paths will fan out, respectively, from each of the initial fan of eight optical paths which will be established about a mid position of the medium 20 of the reflector 42, relating each of the initial fan of eight paths to a corresponding row of the eight coordinate positions at the matrix extending from column A to column H thereof. As in the case of establishing light reflecting paths serially, the high frequency voltages from the generators 43 will be under the control of input signal means connected to the frequency generators through interconnecting circuit means 29 for allowing, accordingly, an energizing of the transducers 25. The use of an array of reflectors 11, 12, 13 and 14 can be utilized to effect a compacting of the overall length of each fan of optical paths stemming, respectively, from each controlled reflector 41 and 42, as in the case of the sequential means of reflecting images of the window means in the matrix 32 toward a reference position at the medium 50.

It should be understood by those skilled in the arts pertaining to the construction and application possibilities of the invention herein set forth that the invention includes other modifications and equivalents as they may be seen by those skilled in the arts, but still being within the scope of the appended claims.

I claim:

1. In a graphic symbol display system:

(a) a primary source of light;

(b) light mask means for providing an array of graphic symbol light beam forming means and means for exposing beam forming means of said array, selectively, to light from said primary source for providing any one of a plurality of individual graphic symbol shaped sources of light;

(c) a graphic symbol display medium;

(d) said array of beam forming means and said display medium positioned, respectively, at first and second ends of graphic symbol shaped light beam optical paths of said system;

(e) optical means positioned along an optical axis of said system intermediate said array of beam forming means and said display medium for projecting an image of a beam forming means selectively exposed to light from said primary source toward a predetermined symbol display position at said display medium, said display position representative of a reference position at said display medium;

(f) acousto-optic light reflector means including an interaction medium and acoustic wave generator means for establishing any of a number of different acoustic wave light reflecting conditions within said medium thereof, said interaction medium positioned intermediate said array of beam forming means and said optical means positioned along said optical axis;

(g) means for exposing a predetermined one of said beam forming means of said array to light from said primary source and establishing, simultaneously, a predetermined one of said light reflecting conditions within said interaction medium for allowing said display medium to be exposed to a light image of said predetermined one of said beam forming means through said optical means and coincident with said reference position at said display medium;

(h) means for exposing another predetermined one of said beam forming means to light from said primary source and establishing, simultaneously, another predetermined one of said light reflecting conditions within said interaction medium for allowing said display medium to be exposed to a light image of said other predetermined one of said beam forming means through said optical means and coincident with said reference position at said display medium.

2. In a graphic symbol display system:

(a) a source of light;

(b) a display medium, said medium positioned along a light output path of said system;

(c) a matrix containing an array of graphic symbol light beam forming means arranged therein substantially along Cartesian coordinates so as to provide a plurality of rows and a plurality of columns of said beam forming means, said matrix positioned along an optical path of said system intermediate said source and said medium;

(d) means for directing light from said source along an input path of said system and exposing said matrix and said light beam forming means therein to light from said source;

(3) first and second individually controlled OFF or ON conditioned light reflection control means positioned, respectively, along said output path intermediate said medium and said matrix;

(f) a voltage source for providing voltages extending over a predetermined range of frequencies and signal means for controlling an extending of a voltage output therefrom, respectively, to each of said first and second light reflection control means;

(g) said signal means allowing an extending of a voltage output from said source to said first reflection control means for an effecting of an ON condition and a corresponding light reflecting path thereat so as to establish an optical path relationship between a predetermined one of said rows of beam forming means in the matrix and said output path;

(h) said signal means allowing an extending of a voltage output from said source to said second reflection control means for an effecting of an ON condition and a corresponding light reflecting path thereat so as to establish an optical path relationship between a predetermined one of said columns of beam forming means in the matrix and said output path and an optical relating of said output path to a selected one of said beam forming means in the matrix;

(i) optical means positioned along said output path for imaging said selected one of the beam forming means at said display medium.

3. In a graphic symbol display system:

(a) a source of light and means for directing light therefrom along an input path of said system;

(b) a display medium, said medium positioned along a light output path of said system;

(c) a matrix containing an array of graphic symbol light beam forming means arranged therein substantially along Cartesian coordinates so as to provide a plurality of rows and a plurality of columns of said beam forming means, said matrix positioned along an optical path of said system intermediate said source and said medium;

(d) first and second individually controlled OFF or ON conditioned light reflection control means positioned, respectively, along said input path intermediate said source and said matrix;

(e) first and second individually controlled OFF or ON conditioned light reflection control means positioned, respectively, along said output path intermediate said medium and said matrix;

(f) a voltage source for providing voltages extending over a predetermined range of frequencies and signal means for controlling an extending of a voltage output therefrom, respectively, to each of said first and second deflection control means and, respectively, to each of said first and second reflection control means;

(g) said signal means allowing an extending of a voltage output from said source to said first deflection control means for an effecting of an ON condition and a corresponding light deflecting path therein so as to allow a beam from said source of light to be deflected in relation to said input path toward a predetermined one of said rows of beam forming means in the matrix;

(h) said signal means allowing an extending of a voltage output from said source to said second deflection control means for an effecting of an ON condition and a corresponding light deflecting path therein so as to allow said beam of light to be deflected in relation to said input path toward a predetermine one of said columns of beam forming means in the matrix and allow a selected one of said beam forming means to be exposed to light of said beam;

(i) said signal means allowing an extending of a voltage output from said source to said first reflection control means for an effecting of an ON condition and a corresponding light reflecting path therein so as to establish an optical path relationship between said predetermined one of said rows of beam forming means in the matrix and said output path;

(j) said signal means allowing an extending of a voltage output from said source to said second reflection control means for an effecting of an ON condition and a corresponding light reflecting path therein so as to establish an optical path relationship between said predetermined one of said columns of beam forming means in the matrix and said output path and an optical relating of said output path to said selected one of said beam forming means exposed to said light of the beam;

(k) optical means positioned along said output path for imaging said selected one of the beam forming means at said display medium.

4. The graphic symbol display system of claim 3, wherein each of said first and second light deflection control means and each of said first and second light reflection control means includes an interaction medium and acoustic wave generating means for effecting a perturbing of the refractive index of said medium in response to an ON conditioned control means.

5. The graphic symbol display system of claim 2 including light mask means positioned along said output for controlling a projecting of said selected one of said images of the beam forming means toward said display medium, and blocking passage of extraneous rays of light and sidebands of light stemming from said first and second light reflection control means.

* * * * *

UNITED STATES PATENT AND TRADEMARK OFFICE

CERTIFICATE OF CORRECTION

PATENT NO. : 4,179,689

DATED : December 18, 1979

INVENTOR(S) : Joseph Thomas Mc Naney

It is certified that error appears in the above—identified patent and that said Letters Patent is hereby corrected as shown below:

Column 7, line 32, "reflection" should read -- deflection --.

Signed and Sealed this

*First* Day of *April 1980*

[SEAL]

*Attest:*

SIDNEY A. DIAMOND

*Attesting Officer* *Commissioner of Patents and Trademarks*